Dec. 2, 1947.  H. H. WELD  2,431,852
TOOLHOLDER ASSEMBLY
Filed March 10, 1944

Inventor
Henry H. Weld

UNITED STATES PATENT OFFICE 2,431,852

TOOLHOLDER ASSEMBLY

Henry H. Weld, Windsor, Vt., assignor to Cone Automatic Machine Company Inc., Windsor, Vt., a corporation of Vermont Application March 10, 1944, Serial No. 525,890

4 Claims. (Cl. 29—96)

This invention relates to a tool holder assembly, herein shown as for a cutting off lathe tool, including the mounting of the tool in the holder.

It has for an object to provide improved means for clamping the tool in its holder by which the tool is not only held securely but is forced against a pair of angularly related surfaces into a predetermined definite relation to the holder.

Another object of the invention is to produce the clamping effect by manipulation of a single adjustable element.

To this and other desired ends the tool holder is provided with angularly related faces against which the tool may be clamped, and the clamping is effected by a rotary wedge element, its wedge effect clamping the tool against one of the holder faces and its rotational effect clamping it against the other of these faces.

Figure 1:
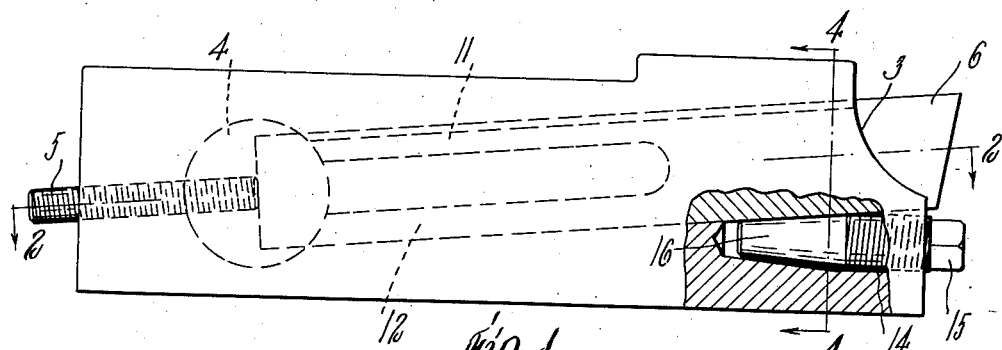

For a more complete understanding of this invention, reference may be had to the accompanying drawings in which Figure 1 is a side elevation, partly broken away and in section, of the tool holder and the tool assembled therein.

Figure 2:
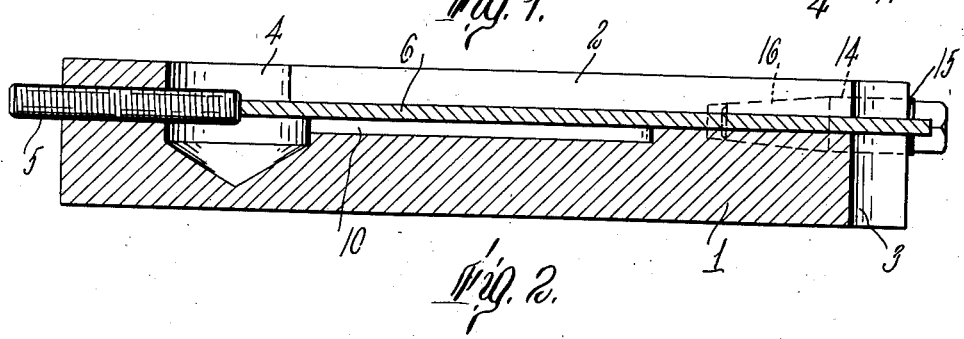
Figure 4:
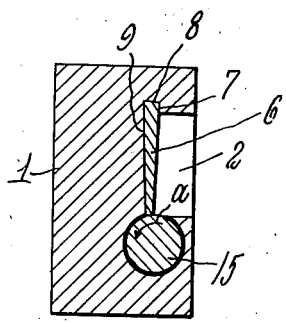

Figures 2 and 4 are sectional views on lines 2—2 and 4—4, respectively, of Figure 1.

Figure 3:
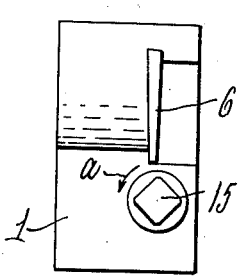

Figure 3 is a right hand elevation of the parts shown in Figure 1.

Referring to the drawings, the tool holder comprises a one piece block 1 having a slot 2 cut inwardly from one face from the forward end 3 of the block and extending toward the opposite end of the block where it intersects a hole 4 drilled in from the same face of the block. As shown the slot is arranged at an inclination to the longitudinal axis of the block, this providing for top rake of a straight top faced tool. A stop screw 5 is threaded through the rear end of the holder 1 with its forward end extending into the hole 4 in position to act as a back-up screw for the shank 6 of a tool, herein shown as a cutting off tool, held by the holder. The base of the slot 2 is widened out or undercut as at 7 forming an edge face 8 angularly disposed to the base 9 of the slot, this widened portion being of sufficient width to receive the tool shank and prevent the tool shank from being removed laterally through the slot 2, it being necessary to insert this tool shank from the forward end of the holder. In order to form suitable accurate bearing surfaces against which the side face of the tool shank may engage, the central portion of this back face may be recessed as at 10 to provide a pair of spaced wall portions 11 and 12 somewhat rearwardly from its forward end.

Through the forward end of the holder is a threaded hole 14 arranged at an inclination to the length of the slot 2, but in its general lengthwise direction, such that back from the forward end of the holder, it intersects this slot. Threaded into this hole is a screw plug 15 provided with a tapered inner extremity 16, the taper being such with relation to the relative inclination between the hole 14 and the slot 2 that over substantially its entire length the tapered portion bears against the tool shank as shown best in Figure 1. It will be evident that as the screw plug is turned to be moved inwardly, this inclined face 16 engages the lower edge of the tool and wedges it upwardly against the face 8 of the tool holder.

From an inspection of Figures 3 and 4 it will be noted that the axis of the hole 14 is slightly offset from the center of the adjacent edge face of the tool shank and the direction of threading of the screw plug 15 is such that when it is turned to wedge the tool shank upwardly against the face 8, it also presses the tool shank laterally against the face 9. Thus as shown the screw plug 15 is provided with left hand threads, the direction of rotation of the plug when it forces the tool shank against the face 8, being counterclockwise as shown by the arrow a of Figures 3 and 4, forcing the shank against the wall 9 of the holder. Thus a single clamping element when moved in clamping direction forces the tool shank against two angularly related tool shank supporting faces on the tool holder.

From the foregoing description of an embodiment of the invention, it should be evident to those skilled in the art that various changes and modifications might be made without departing from its spirit or scope.

I claim:

1. In combination, a tool holder having a tool receiving slot provided with a pair of angularly disposed faces, a tool having a shank shaped to enter said slot and having faces for engagement with said angularly disposed faces, and an element adjustably mounted on said holder for motion generally lengthwise of said slot and having a portion engageable with said tool shank and movable by said adjustment to press the faces of said tool against both of said holder faces.

2. In combination, a tool holder having a tool receiving slot provided with a pair of angularly disposed faces, a tool having a shank shaped to enter said slot and having faces for engagement with said angularly disposed faces, an element adjustably mounted on said holder for motion generally lengthwise of said slot and having a portion engageable with said tool shank and movable by said adjustment to press the faces of said tool against both of said holder faces, and a stop carried by said holder engageable with the rear end of said shank to take the thrust on said tool produced by pressure of the tool on the work.

3. In combination, a tool holder having a tool-receiving slot provided with a pair of angularly disposed faces, a tool having a shank shaped to enter said slot and provided with faces for engagement with said angularly disposed faces, a screw extending lengthwise of said shank and having threaded engagement in said holder and having a tapered portion engageable with said shank in position to wedge said shank in a direction to force one of its faces against one of said holder faces on axial motion of said screw in one direction, the thread direction of said screw being such that rotation of said screw to produce such one direction axial motion imparts pressure to said shank in the direction to bring the other of said shank faces against the other of said holder faces.

4. A tool holder having a tool shank receiving slot provided with a pair of angularly disposed faces, said holder having a hole with its axis inclined toward a third face of said slot opposite to one of said pair of faces and extending generally lengthwise of said slot and offset from the center of said third face away from the other of said pair of faces, and a screw threaded into said hole and provided with a tapered extremity arranged to contact along its length lengthwise with the shank of a tool mating and within said slot, the direction of threading of said screw being such that as it is turned to press said tapered portion against said shank to force said shank against said one face it presses said shank against the other of said pair of faces.

HENRY H. WELD.

REFERENCES CITED

The following references are of record in the file of this patent:

UNITED STATES PATENTS

| Number | Name | Date |
| --- | --- | --- |
| 534,513 | Martin | Feb. 19, 1895 |
| 622,625 | Hill | Apr. 4, 1899 |
| 1,793,564 | Severson | Feb. 24, 1931 |
| 1,736,273 | Miller | Nov. 19, 1929 |
| 1,584,347 | Armstrong | May 11, 1926 |

FOREIGN PATENTS

| Number | Country | Date |
| --- | --- | --- |
| 18,297 | Great Britain | Aug. 5, 1915 |
| 633,669 | Germany | Aug. 3, 1936 |
| 11,225 | Great Britain | Aug. 13, 1884 |